April 19, 1955  J. G. WITHERS ET AL  2,706,607
SUPPORTING OF ENGINES AND OTHER MACHINERY
Filed March 29, 1951  4 Sheets-Sheet 1

INVENTORS:
Richard Stansfield
John Granville Withers

April 19, 1955   J. G. WITHERS ET AL   2,706,607
SUPPORTING OF ENGINES AND OTHER MACHINERY
Filed March 29, 1951   4 Sheets-Sheet 2
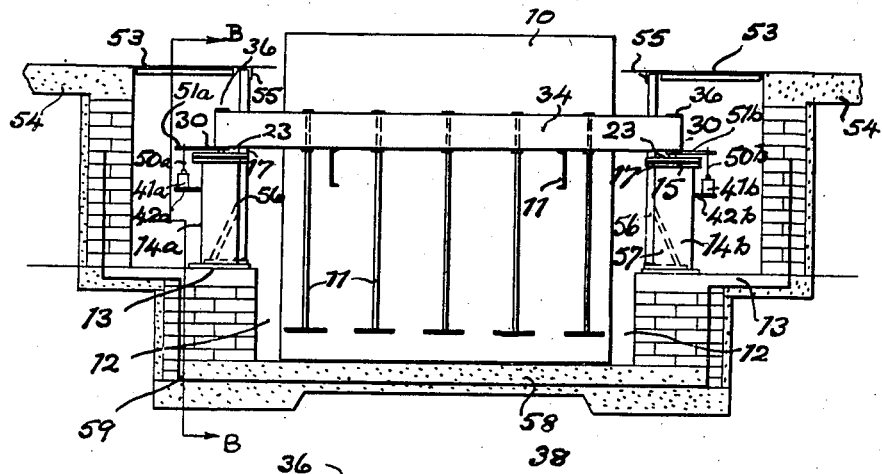
Fig. 2.
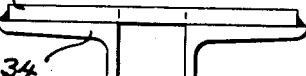
Fig. 6.
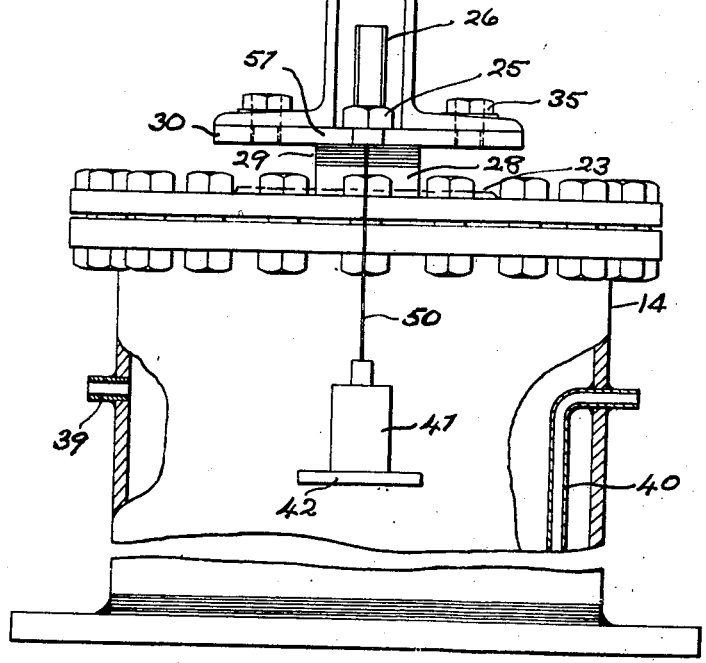
INVENTORS:
Richard Stansfield
John Granville Withers April 19, 1955   J. G. WITHERS ET AL   2,706,607
SUPPORTING OF ENGINES AND OTHER MACHINERY
Filed March 29, 1951   4 Sheets-Sheet 3
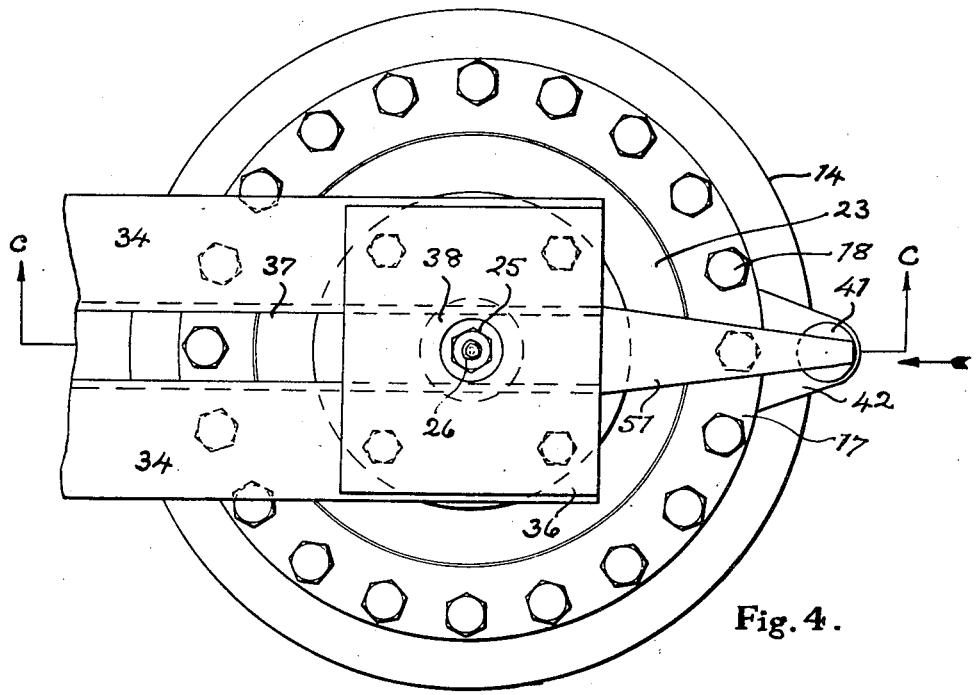
Fig. 4.
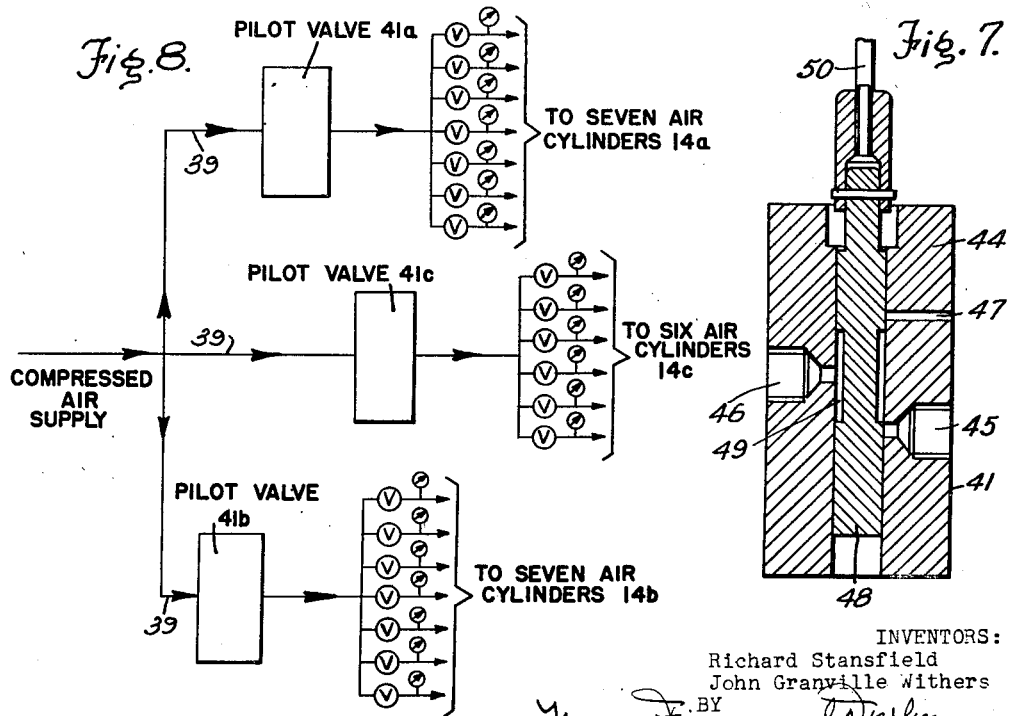
INVENTORS:
Richard Stansfield
John Granville Withers
BY

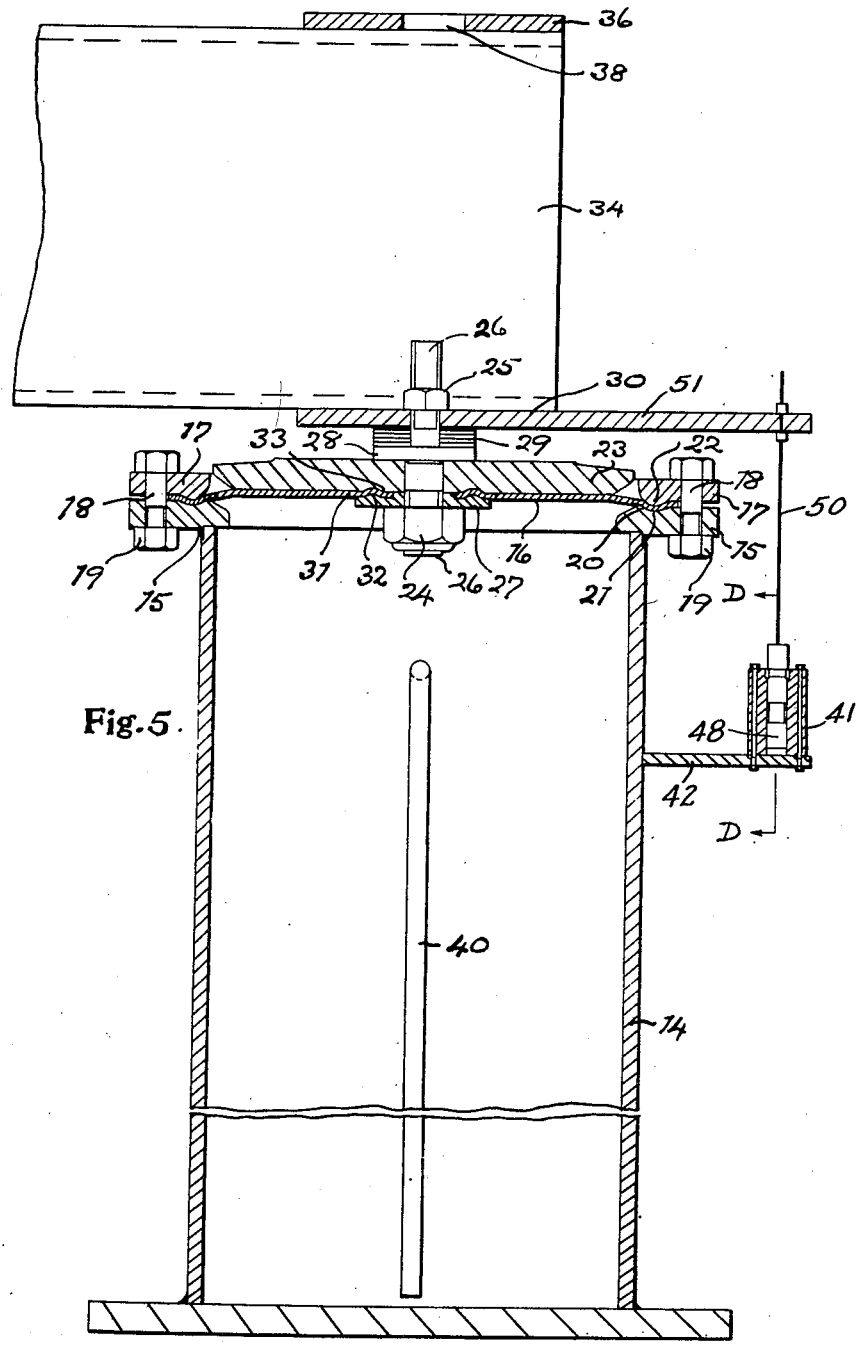

United States Patent Office 2,706,607
Patented Apr. 19, 1955

2,706,607

SUPPORTING OF ENGINES AND OTHER MACHINERY

John Granville Withers and Richard Stansfield, Sunbury-on-Thames, England, assignors to The British Petroleum Company Limited Application March 29, 1951, Serial No. 218,164

Claims priority, application Great Britain March 31, 1950

2 Claims. (Cl. 248—22)

This invention relates to an improved method of, and means for, supporting engines and other machinery whereby forces created by moving parts being out of balance are not transmitted to the ground or supporting floor.

It is known that support of this nature may be provided by mounting the engine and its under-bed on metal springs which are usually coiled springs, leaf springs, or a combination of the two. In order to prevent the build up of vibrations when the engine is running, it is essential that the natural frequency of vibration of the spring system be considerably less than the frequency of vibration corresponding to the lowest unbalanced frequency to be dealt with. It has been found desirable in practice to use springs which give the system a natural frequency of vibration one third, or less, of the frequency of vibration corresponding to the lowest unbalanced frequency to be dealt with. Friction or viscous damping may be introduced to prevent undue build-up of vibrations when the engine is running up to working speed as it passes through the speed corresponding to the natural frequency of the sprung system as a whole, but such damping, while suitable for engines running at a constant speed only, tends to destroy the value of the suspension if the engine has at times to be run at considerably higher speeds.

The use of metal springs is difficult and expensive when very large masses have to be supported for use at low running speeds. With engines running at low speeds a very "soft" mounting is necessary for the reasons stated above and it is necessary to use large springs, with large deflections, which gives rise to obvious difficulties. In addition, leaf springs may give excessive damping.

Various pneumatic devices have been proposed from time to time to give flexible support or coupling between one part of a system and another but it is the object of this invention to provide a means for insulating an engine system from the supporting floor so as to prevent vibrations arising in the supported system from being transmitted to and through the supporting floor.

According to the invention, a method of supporting engines and other machines such that forces created by moving parts being out of balance are not transmitted to the supporting floor, consists in mounting the engine on a number of flexible diaphragms each of which is secured in a pressure-tight manner to a corresponding air chamber containing air maintained at a pressure sufficient to enable the diaphragms to support the weight of the engine.

The invention also includes apparatus for supporting engines and other machines such that forces created by moving parts being out of balance are not transmitted to the supporting floor, which comprises a number of air chambers having secured thereto in a pressure-tight manner, corresponding flexible diaphragms on which the engine is mounted, the air in the air chambers being maintained at a pressure sufficient to enable the diaphragms to support the weight of the engine.

Advantageously the air chambers consist of open-topped cylinders each having a flexible diaphragm secured over the open end in a pressure-tight manner. In order to withstand the pressure in the air chambers the flexible material is preferably natural rubber, synthetic rubber or other synthetic flexible material which may be reinforced if necessary by such materials as cotton, fibre or metal gauze. The engine is conveniently mounted on a solid concrete under-bed having a number of horizontal steel beams projecting from it, corresponding to the number of air chambers, the ends of the steel beams resting on circular metal discs secured centrally to and resting on top of the flexible diaphragms.

According to a further feature of the invention, the air chambers are arranged around the under-bed in three series, each series having a separate supply of air regulated by the height of the under-bed at a given point so as automatically to compensate for changes in the disposition of the load on the bed and maintain the bed in a horizontal position.

The invention will now be described, by way of example only, with reference to the accompanying drawings in which:

Figure 2 is a vertical section along the line AA in Figure 1,

Figure 4 is a plan of an air cylinder with a pilot valve attached,

Figure 5 is a section along the line CC of Figure 4,

Figure 6 is an elevation looking in the direction of the feathered arrow in Figure 4, parts of the cylinder being broken away, Figure 7 is a section through a pilot valve along the line DD of Figure 5, and Figure 8 is a schematic showing of an air supply-pilot valve system for the cylinders.

Figure 1:
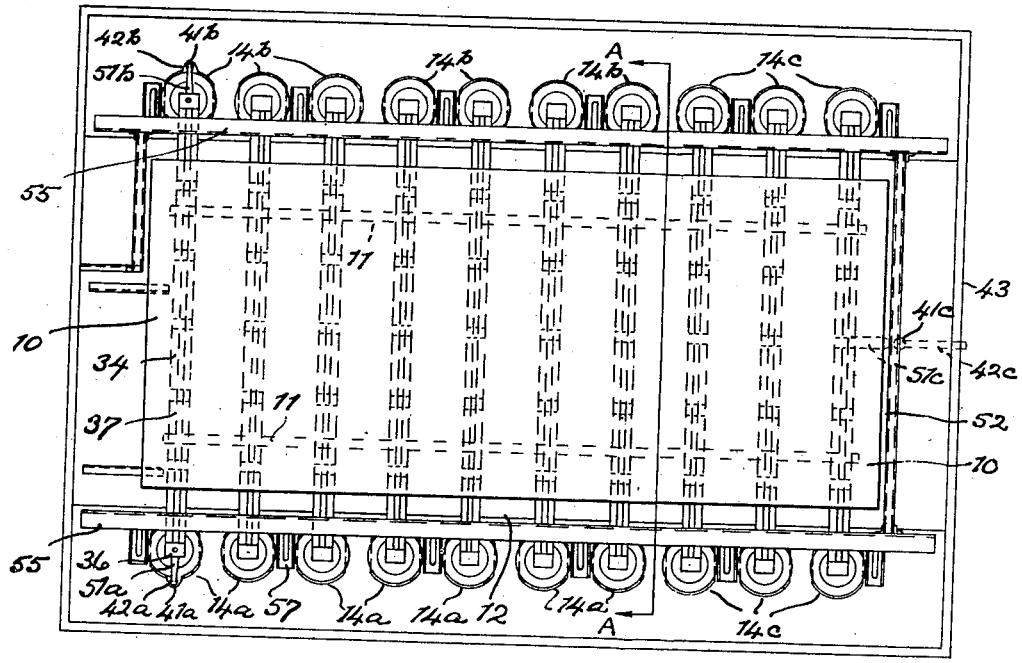
Figure 1 is a plan of the under-bed and its supporting structure.

The engine is mounted on a solid, rectangular, concrete under-bed 10 reinforced by iron reinforcing members 11 and located in a rectangular trough 12 formed with shelves 13 along its two longer sides. Along each shelf are located ten open-topped, steel, air cylinders 14 which are provided at the top with outwardly directed flanges 15 welded to the cylinders. The top of each cylinder is closed by a circular, flexible, neoprene diaphragm 16 clamped to the flange 15 by means of a ring 17 held by bolts 18 and nuts 19 so as to make an airtight seal. The neoprene diaphragm 16 is formed near its periphery with a curved channel 20 which fits correspondingly curved portions 21 and 22 of the flange 15 and ring 17 respectively. A circular metal disc 23 of slightly smaller diameter than the inside diameter of the ring 17 rests on the diaphragm 16. The disc 23 is held in position on the diaphragm 16 by means of nut 24 and bolt 26 passing through central holes in the disc 23 and diaphragm 16, the bolt 26 making a close sliding fit in the central hole in the disc 23. Bolt 26 has a collar 28 machined integral with it. Ring 27 is clamped under the diaphragm 16 by nut 24. A curved channel 31 is formed in the diaphragm 16 around the central hole to fit correspondingly curved portions 32 and 33 in the ring 27 and disc 23 respectively. Packing rings 29 and a rectangular plate 30 are clamped against collar 28 by nut 25.

Passing horizontally through the concrete under-bed 10 are ten pairs of steel beams 34, the ends of which rest on the plates 30 and are bolted thereto by means of bolts 35. A supporting plate 36 is welded to the ends of each pair of beams. The beams of each pair are spaced apart and the nut 25 and upstanding portion of the bolt 26 are accommodated in the space 37. The plate 36 is provided with a hole 38 to facilitate removal of the nut 25.

The diaphragms 16 have a small limited vertical movement and the relative positions of the cylinders 14 and under-bed 10 are such that when the diaphragms are at the bottom of this movement, i. e. when they are sagging slightly within the cylinders the under-bed is resting on the concrete base at the bottom of the trough 12. On cylinders are adapted to be supplied with compressed air via connections 39. Blow-down pipes 40 are provided. The air is at a sufficient pressure (in this case about 80 pounds per sq. inch) to raise the under-bed of the engine from the concrete base. The volume of air pumped in is sufficient to give the under-bed a comparatively small lift within the normal limit of movement of the diaphragms which are not therefore subjected to any unnecessary strain. The gap between the under-bed 10 and the concrete base 58 is conveniently about a quarter of an inch. In Figure 5 the diaphragm is shown in the raised, or loaded position. In order to give, in effect, a table three-legged mounting to the engine and its under-ed, the air cylinders are arranged in three groups 14a seven cylinders), 14b (seven cylinders) and 14c (six ylinders) each group having a separate air supply controlled by a pilot valve 41 resting on a platform 42. Group 14a is supplied with compressed air via pilot valve 1a resting on a platform 42a secured to the end cylinder of the group; group 14b is supplied with compressed air via pilot valve 41b resting on platform 42b secured to the end cylinder of the group; group 14c, consisting of three cylinders on either side of the bed, is supplied with compressed air via pilot valve 41c resting on platform 42c secured to the centre of the end wall 43 of the trough.

Figure 3:
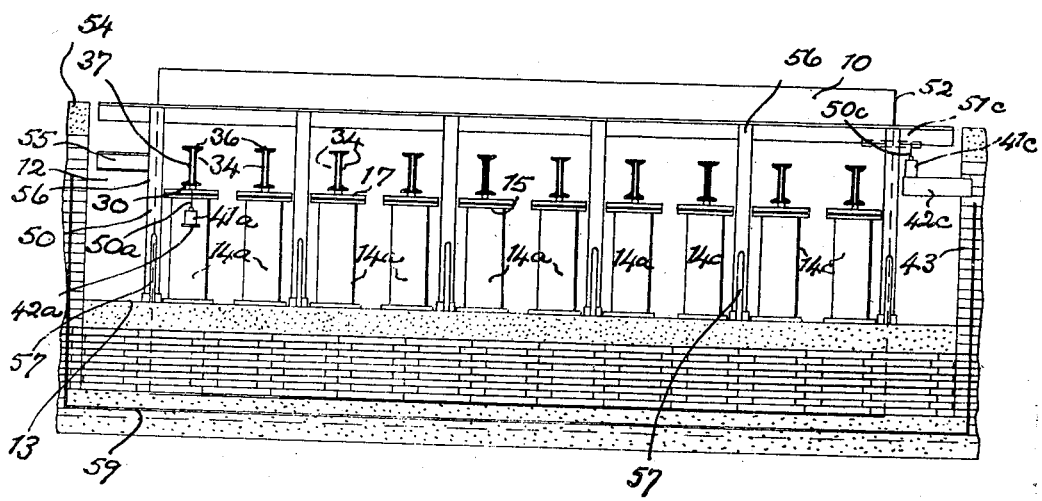
Figure 3 is a vertical section along the line BB in Figure 2.

Each pilot valve 41 (Figure 7) comprises a hollow cylindrical casing 44 provided with an air-supply port 45, an air-delivery port 46 and a relief port 47. The valve piston 48 has an annular groove 49 which in one position of the piston connects the supply and delivery ports, in another connects the delivery and relief ports and in a third, intermediate position shown in Fig. 7 makes no connection between any of the ports. The piston of each pilot valve is provided with an upwardly projecting rod 50. Rod 50a best seen in Fig. 2 (of pilot valve 41a) is connected to a horizontal projection 51a best seen in Fig. 1 of the rectangular plate 30; rod 50b best seen in Fig. 2 (of pilot valve 41b) is connected to a similar horizontal projection 51b best seen in Fig. 1; rod 50c best seen in Fig. 3 (of pilot valve 41c) is connected to a horizontal member 51c best seen in Fig. 3 projecting from the end face 52 of the under-bed. The position of the piston of each pilot valve is thus determined by the height of the neighbouring portion of the under-bed, and the connecting rods 50 are so arranged that there is a tendency for the under-bed to be maintained horizontal at all times. For example, if the under-bed is depressed at any point due to a temporary increase in weight at that point, the nearest pilot valve opens to allow an increase in the air pressure in its associated group of cylinders which causes a compensating uplift of the bed. The opposite effect occurs if there is a temporary relief of pressure at any point on the bed. The connections between the air supply and the pilot valves, and between the pilot valves and air cylinders, may be as indicated in Fig. 8, but a separate valve and pressure gauge is provided in the supply line to each cylinder. Compressed air is led from a source of supply by a main pipe which divides into three branch pipes, one of which is connected to pilot valve 41a, one to 41b and the third to 41c. The three branch pipes are connected to the air supply ports 45 in the pilot valves 41a, b and c. Air delivery pipes lead from each of the delivery ports 46 in the pilot valves 41a, b and c, and each of these delivery pipes sub-divides into a number of subsidiary pipes according to the number of air chambers to be supplied. The pipe leaving pilot valve 41a divides into seven subsidiary pipes which supply the seven cylinders 14a. Similarly, the pipe leaving pilot valve 41b divides into seven subsidiary pipes which supply the seven cylinders 14b. The pipe leaving pilot valve 41c divides into six subsidiary pipes which supply the six cylinders 14c.

A steel platform 53 is provided around the under-bed so as to enable access to be gained to the engine (not shown) mounted on the under-bed. The platform is supported at its outer edge on the site concrete 54 and its inner edge by beams 55 resting on pillars 56 strengthened by strut members 57. The steps 13 and base 58 of the trough are made of concrete. The vertical walls of the trough are constructed of brick. An asphalt damp-proof course 59 is provided.

We claim:
1. Apparatus for supporting heavy, running machinery such that forces created by moving parts being out of balance are not transmitted to the surroundings, comprising a plurality of series of air cylinders positioned around the machinery to be supported, said cylinders being open at their upper ends, a number of flexible diaphragms corresponding to the number of cylinders secured over the open ends of the air cylinders in a pressure-tight manner; a number of rigid discs corresponding to the number of cylinders of a smaller diameter than the diaphragms and positioned centrally on top of the diaphragms whereby when the air cylinders are filled with air under pressure the running machinery is supported on the rigid discs without undue amplitude of vibration; a separate supply of compressed air for each series of air cylinders; a separate pilot valve for controlling the supply of compressed air to each series; the pilot valves being spaced apart around the machinery to be supported; and, separate means for regulating each pilot valve according to the height of the adjacent portion of the machinery, whereby the air supplies to the three series of air cylinders are automatically adjusted to compensate for changes in the disposition of the load on the discs so as to maintain the machinery in a horizontal position.

2. Apparatus for supporting heavy, running machinery such that forces created by moving parts being out of balance are not transmitted to the surroundings, comprising three series of air cylinders positioned around the machinery to be supported, said cylinders being open at their upper ends; a corresponding number of flexible diaphragms secured over the open ends of the air cylinders in a pressure-tight manner; a corresponding number of rigid discs of a smaller diameter than the diaphragms and positioned centrally on top of the diaphragms whereby when the air cylinders are filled with air under pressure the running machinery is supported on the rigid discs without undue amplitude of vibration; a separate supply of compressed air for each series of air cylinders; a separate pilot valve for controlling the supply of compressed air to each series; the pilot valves being spaced apart around the machinery to be supported; and, separate means for regulating each pilot valve according to the height of the adjacent portion of the machinery, whereby the air supplies to the three series of air cylinders are automatically adjusted to compensate for changes in the disposition of the load on the discs so as to maintain the machinery in a horizontal position.

References Cited in the file of this patent

UNITED STATES PATENTS

| | | |
|---|---|---|
| 1,111,739 | Davis | Sept. 29, 1914 |
| 1,141,360 | Rudd | June 1, 1915 |
| 1,668,669 | Caldwell | May 8, 1928 |
| 1,797,146 | Hull | Mar. 17, 1931 |
| 2,235,160 | Ljungstrom | Mar. 18, 1941 |
| 2,408,169 | Hoffer | Sept. 24, 1946 |
| 2,605,066 | Brown | July 29, 1952 |
| 2,616,373 | Goddard | Nov. 4, 1952 |

FOREIGN PATENTS

| | | |
|---|---|---|
| 320,267 | Germany | Apr. 16, 1920 |
| 766,097 | France | Apr. 9, 1934 |